United States Patent Office 3,558,242
Patented Jan. 26, 1971

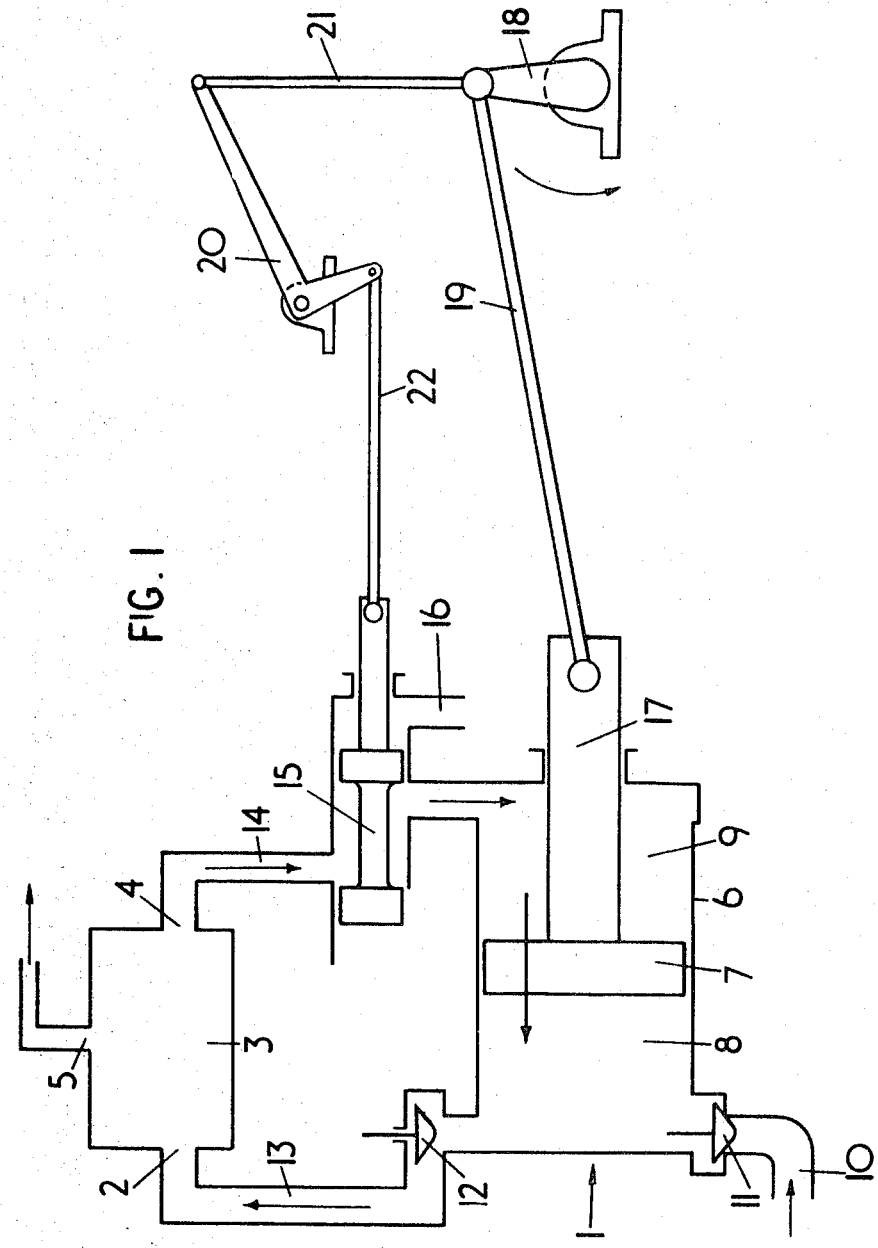

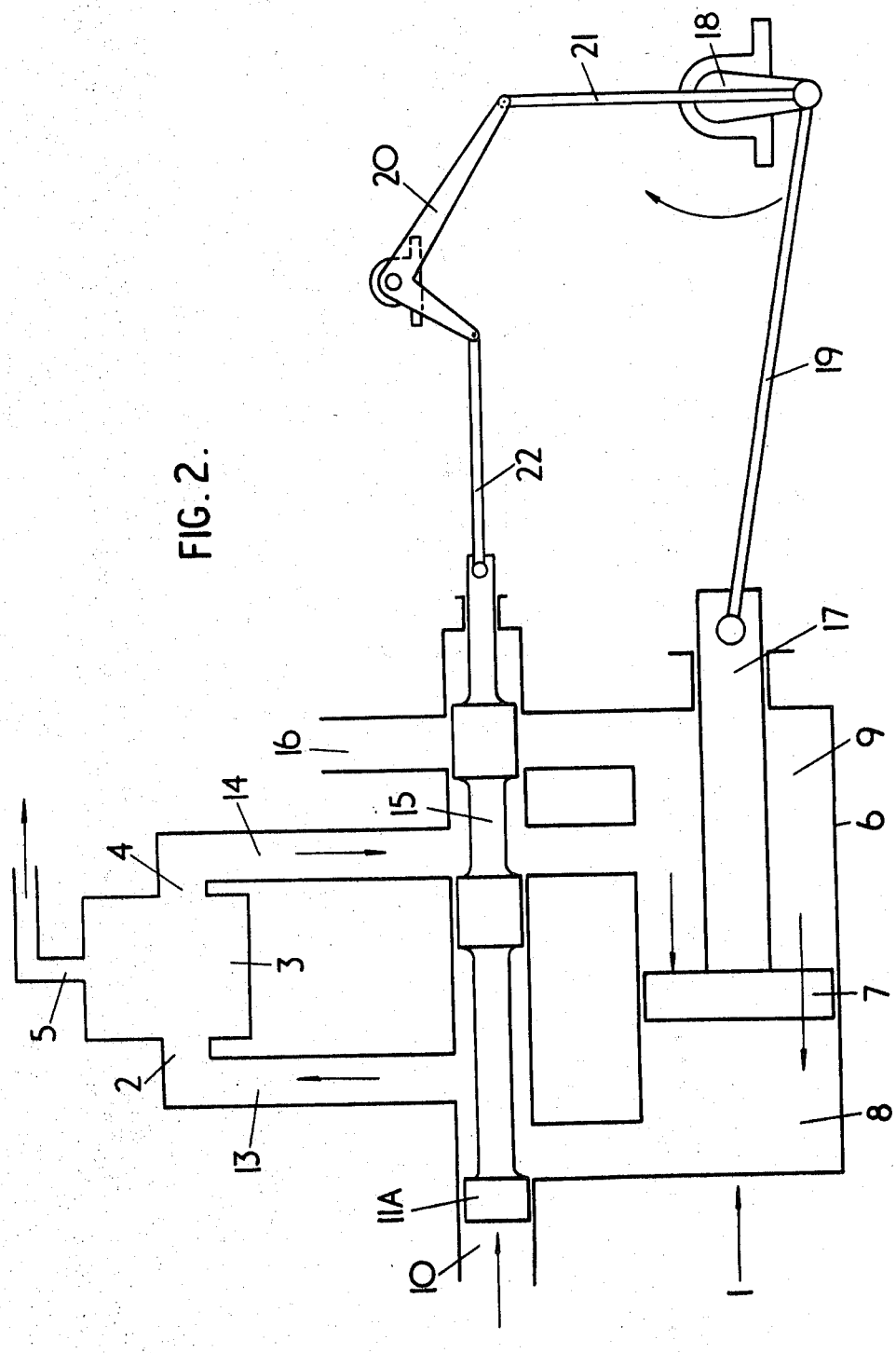

3,558,242
PUMP FOR DESALINATION PLANT
William Dixon Jenkyn-Thomas, London, England, assignor to Petersen Candy International Limited, London, England, a British company
Filed Mar. 4, 1969, Ser. No. 804,081
Int. Cl. F04b 9/02
U.S. Cl. 417—374                          2 Claims

ABSTRACT OF THE DISCLOSURE

The invention comprises a pump for a desalination plant operating by the process of reverse osmosis, which is driven by a piston engine operated by the pressure of rejected liquid of the process, and may be formed with a common cylinder in which the piston of the engine is coupled to the piston of the pump by a common piston rod. Alternatively the pump and the engine may have a common cylinder and a common piston. Whichever is the case suitable valves are provided for connecting the chambers of the engine and the piston in appropriate manner as the pump rotates.

---

The invention relates to a pump for a desalination plant, while the object of the invention is to provide a pump which is efficient and particularly adapted for use with plant of the smaller kind.

The invention consists in a piston pump for a plant operating by the process of reverse osmosis for the desalination of water, characterised in being provided with a piston engine adapted to be driven by the pressure of the rejected liquid of the process.

The invention further consists in a piston pump as set forth in the preceding paragraph, in which the piston engine is coupled to the piston pump by a common piston rod.

The invention still further consists in a piston pump as set forth in the preceding paragraph, in which the pump and the engine have a common cylinder and a common piston, the chamber constituted by that part to one side of the piston being conected alternately by valve means to the source of saline water, and the desalination unit, and the chamber constituted by that part at the other side of the piston being connected by valve means alternately to the source of rejected liquid under pressure from the unit, and to exhaust as appropriate.

The invention still further consists in a piston pump as set forth in the preceding paragraph in which the valve means of the piston engine are operated by a lever mechanism in such manner that the area of passageway through the valve means is proportional to the rate of flow of the liquids therethrough.

The accompanying drawings show by way of example only, two embodiments of the invention in which:

FIG. 1 is a diagrammatic representation of a combined piston pump and pitson engine with automatic inlet and outlet valves to the pump, while FIG. 2 shows a similar construction with positively operated inlet and outlet valves to the pump.

The construction shown in FIG. 1 comprises a piston pump 1 for supplying under pressure saline water on the one hand to the inlet 2 of a desalination unit 3, in which desalination is carried out by reverse osmosis, and on the other hand which is assisted in its operation by a pressure of rejected liquid leaving the unit by the outlet 4. The treated water leaves by the outlet 5.

The saline water to be treated has to be raised to a high pressure, and only a relatively small portion of the raw water is recovered as treated salt-free product, the remainder has to be rejected to waste. The pump constructed in accordance with the present invention is intended to recover as much energy as possible from this rejected liquid. Particularly is this desirable in a treatment of sea water, where the quantity rejected may be as much as 75% or 80% of the water to be treated, while the pressure may be as much as 2,000 p.s.i.

It has been previously proposed to use a centrifugal pump for the input liquid, and to recover the energy in the rejected liquid by passing it through a turbine. This is satisfactory when quantities of liquid involved are large, but as the plants get smaller this arrangement is of less and less advantage economically, since the efficiency of both turbines and particularly centrifugal pumps falls rapidly as their size is reduced.

It is therefore proposed in accordance with the present invention to provide a piston pump and a piston engine for recovering the energy in the rejected liquid. In the preferred embodiment of the invention shown in the accompanying figure, the pump and the engine have a common cylinder 6 and a common piston 7, the space 8 to the left of the pitson 7 constituting the chamber of the pump and the space 9 to the right of the piston constituting the chamber of the engine.

The pump is connected to the source of saline water by a pipe 10, having an inlet non-return valve 11 of the gravity, spring loaded or other kind, while the outlet of the pump is connected by way of the non-return valve 12 by the pipe 13 to the inlet 2 of the desalination unit 3.

The rejected liquid passing out of the outlet 4 of the desalination unit, is conveyed by the pipe 14 to the mechanically operated valve 15, where it is directed at the commencement of the stroke of the piston 7 into the chamber 9 of the engine to assist in the operation of the pump. At the end of the stroke the valve 15 directs the liquids from the cylinder to the exhaust outlet 16.

The piston 7 is provided with a piston rod 17, which makes a liquid tight sliding fit in a bore in the end of the cylinder, and is caused to reciprocate by a crank 18 and connecting rod 19, the crank being caused to rotate by an electric motor or other prime mover, not shown, as desired. The diameter of the piston rod 17 is so chosen to provide a ratio between the area of the pump side of the piston 7 and the effetcive area of the engine side of the piston 7, the same as the ratio between the volume of saline water passing into the desalination unit by way of the inlet 2, and the volume of rejected liquid leaving the desalination unit by way of the outlet 4, per unit of time. By this arrangement the energy from the rejected liquid is recovered directly as a form of assistance for the pumping piston, thus reducing the load on the connecting rod, crank shaft and prime mover.

The valve 15 is operated by a bell crank 20 connected to the pin of the crank 18 and the valve 15 respectively by the connecting rods 21 and 22. The arrangement is such that the displacement of the valve from its midposition is proportional to the piston velocity, that is, the rate of flow of liquid through it, and hence the opening of the valve is proportional to the rate at which liquid flows through it, and consequently the flow of the liquid through the valve has a constant velocity. The loss of pressure is constant throughout the stroke and varies with the size of valve provided.

The form of valve shown is simple to construct and avoids the need for delicate profiling and cam cutting.

In the alternative form of construction shown in FIG. 2 the inlet valve 11 and outlet valve 12 of FIG. 1 are substituted by the positively operated valve 11A, connected to an extension of the stem of the valve 15, which, when in the position shown in FIG. 2 closes the pipe 10 connected to the source of saline water, and allows the liquid in the space 8 to flow into the pipe 13 .

When the valve 11A is moved to the right of FIG. 2 by the link mechanism, the outlet of the pipe 13 is closed while pipe 10 is opened, so that the saline water can flow into the space 8 as the piston moves to the right. By this means the pump may be operated at higher speeds, and, therefore, give a greater output for the same size.

In an alternative form of construction there are two cylinders, a pump and an engine cylinder, each containing a piston, the pistons being coupled by a common piston rod, while the diameters of the cylinders may be different so as to provide the desired ratio of effective areas of the piston of the pump and the piston of the engine.

In a still further form of construction the pump and the engine can be separate from one another and be mechanically connected by a connecting rod, while other details for carrying the invention into effect may be varied without departing from the scope of the invention claimed.

I claim:

1. A piston pump for a plant operating at high pressure by the process of reverse osmosis for the desalination of water, driven by a piston engine, comprising a cylinder with a piston slideable therein, the space of one side of said piston forming an expansible and contractible chamber acting as a pump, the space of the other side of said piston forming an expansible and contractible chamber acting as an engine, a bore in the end of said cylinder acting as an engine, a piston rod making a close sliding fit in said bore and connected to said piston, a crank with a connecting rod connected to said piston rod, a prime mover driving said crank, an inlet connection to the pump chamber adapted to be connected to a source of raw water, a valve controlling said inlet connection, a valve controlled outlet to the pump chamber, said outlet being adapted to be connected to the raw water inlet of said plant, an inlet to said plant, an inlet to the engine chamber adapted to be connected to the outlet of liquid rejected from said plant, a two way valve controlling said inlet of rejected water to said engine chamber and passage of the rejected water from said engine chamber to waste, respectively, the effective areas of the sides of the piston in said pump chamber and said engine chamber being proportional to the volumetric rate of flow of water at the inlet of the raw water at the plant and the outlet of rejected water from the plant, respectively.

2. A piston pump as claimed in claim 1 further including a lever mechanism and a connecting rod operatively connecting said two way valve to said crank in such a manner that the area of passageway through said two way valve is proportional to the rate of flow of liquid therethrough.

References Cited

UNITED STATES PATENTS

| | | | |
|---|---|---|---|
| 142,092 | 8/1873 | Earle | 103—207 |
| 212,978 | 3/1879 | Plumer | 103—52 |
| 1,909,145 | 5/1933 | Berenbruch | 103—52 |
| 2,591,441 | 4/1952 | Kollsman | 103—52 |

ROBERT M. WALKER, Primary Examiner